March 26, 1946. C. J. STRID 2,397,299
EMERGENCY HAND PUMP SELECTOR VALVE
Filed May 28, 1943 2 Sheets-Sheet 1
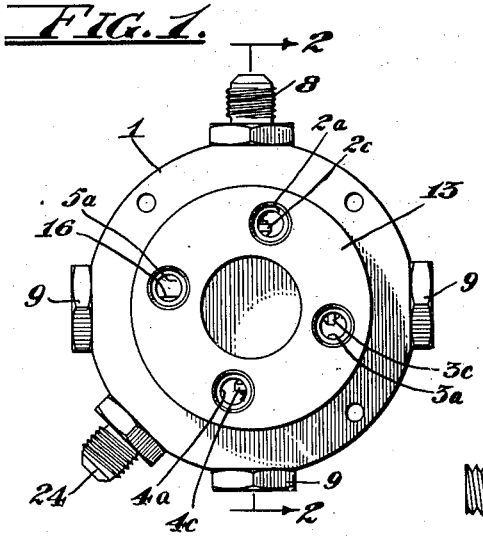
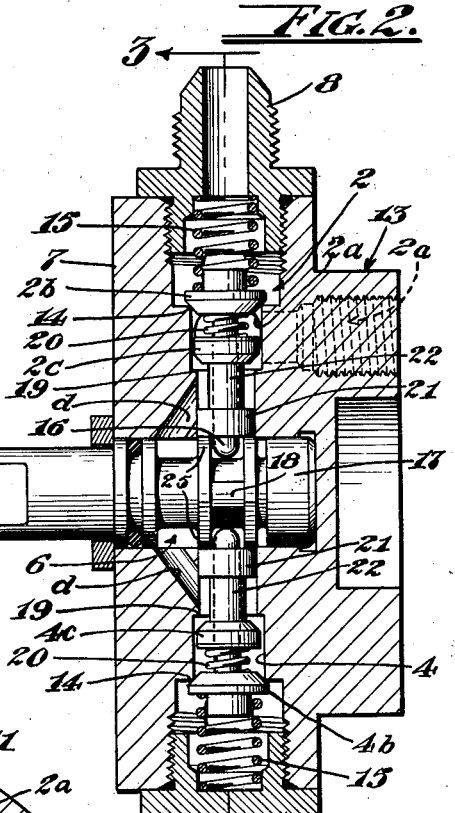
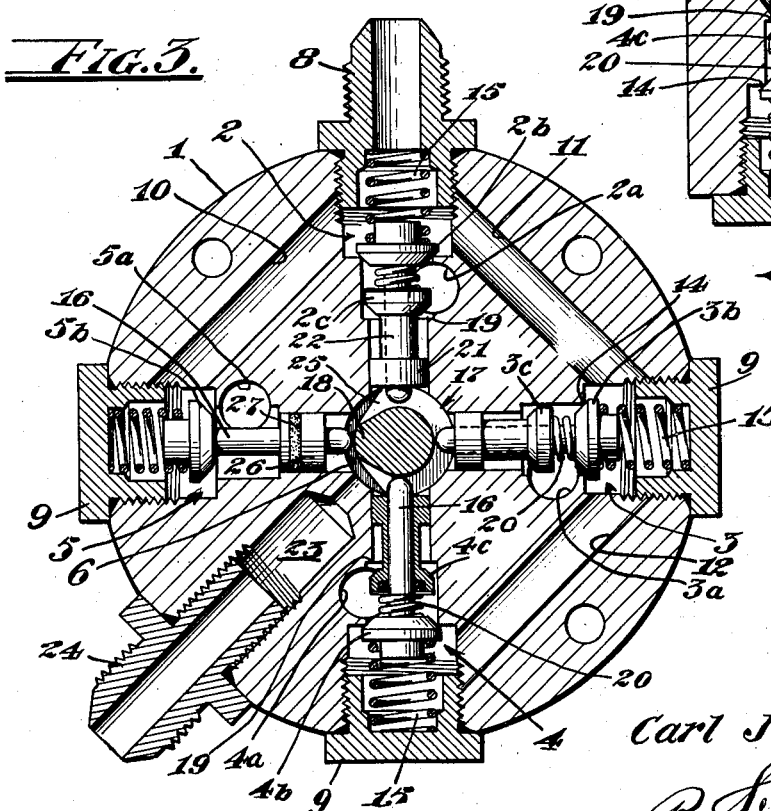
Inventor
Carl J. Strid
By R. S. Burns
Attorney Patented Mar. 26, 1946

2,397,299

UNITED STATES PATENT OFFICE 2,397,299

EMERGENCY HAND PUMP SELECTOR VALVE

Carl J. Strid, La Canada, Calif., assignor to Adel Precision Products Corp., a corporation of California Application May 28, 1943, Serial No. 488,907

8 Claims. (Cl. 277—20)

This invention relates to improvements in selector valves for controlling hydraulic systems, particularly for operating the surface control elements, bomb doors, landing gear and other component mechanisms of an aircraft.

The primary object of this invention is to provide a small, compact, light-weight and highly efficient selective valve unit which may be readily and easily operated by means of a single handle to direct pressure fluid from a hand operated emergency pump into the regular lines of a hydraulic system made up of a motor driven pump and a plurality of independently operable hydraulic cylinders and control valves, for the purpose of affording a normal operation of the system by pressure fluid from the hand pump in case the motor pump is shut off or fails; or into any one of several independent emergency lines for conducting emergency pressure fluid directly to the cylinders whereby an emergency operation of a selected cylinder may be effected in case of failure of the motor operated pump or other components of the main system.

Another object of my invention is to provide a hand pump selector valve such as described by means of which the emergency lines supplying pressure fluid therefrom to the cylinders through shuttle valves are always vented to the low pressure side of the system when the emergency pressure is not applied, thereby preventing accidental shifting of the shuttle valves upon thermal expansion of the fluid in the system.

A further object of my invention is to provide an emergency hand pump selector valve of the character described which makes it possible to use a single hand pump to selectively operate a plurality of emergency systems, also to substitute at will the hand pump for the motor pump.

Another object of this invention is to provide an emergency hand pump selector valve which will allow return fluids to pass therethrough to the low pressure side of the system when a cylinder is operated through the instrumentality of the main system and the shuttle valve connected with the operated cylinder is in the wrong position to permit of the normal flow of return flow through the main system return line.

With the foregoing objects in view, together with such other objects and advantages as may subsequently appear, the invention resides in the parts and in the combination, construction and arrangement of parts hereinafter described and claimed, and illustrated by way of example in the accompanying drawings in which:

Fig. 1 is a rear elevation of a valve unit embodying my invention;

Fig. 2 is an enlarged vertical sectional view taken on the line 2—2 of Fig 1;

Fig. 3 is a vertical sectional view taken on the line 3—3 of Fig. 2;

Figure 4:
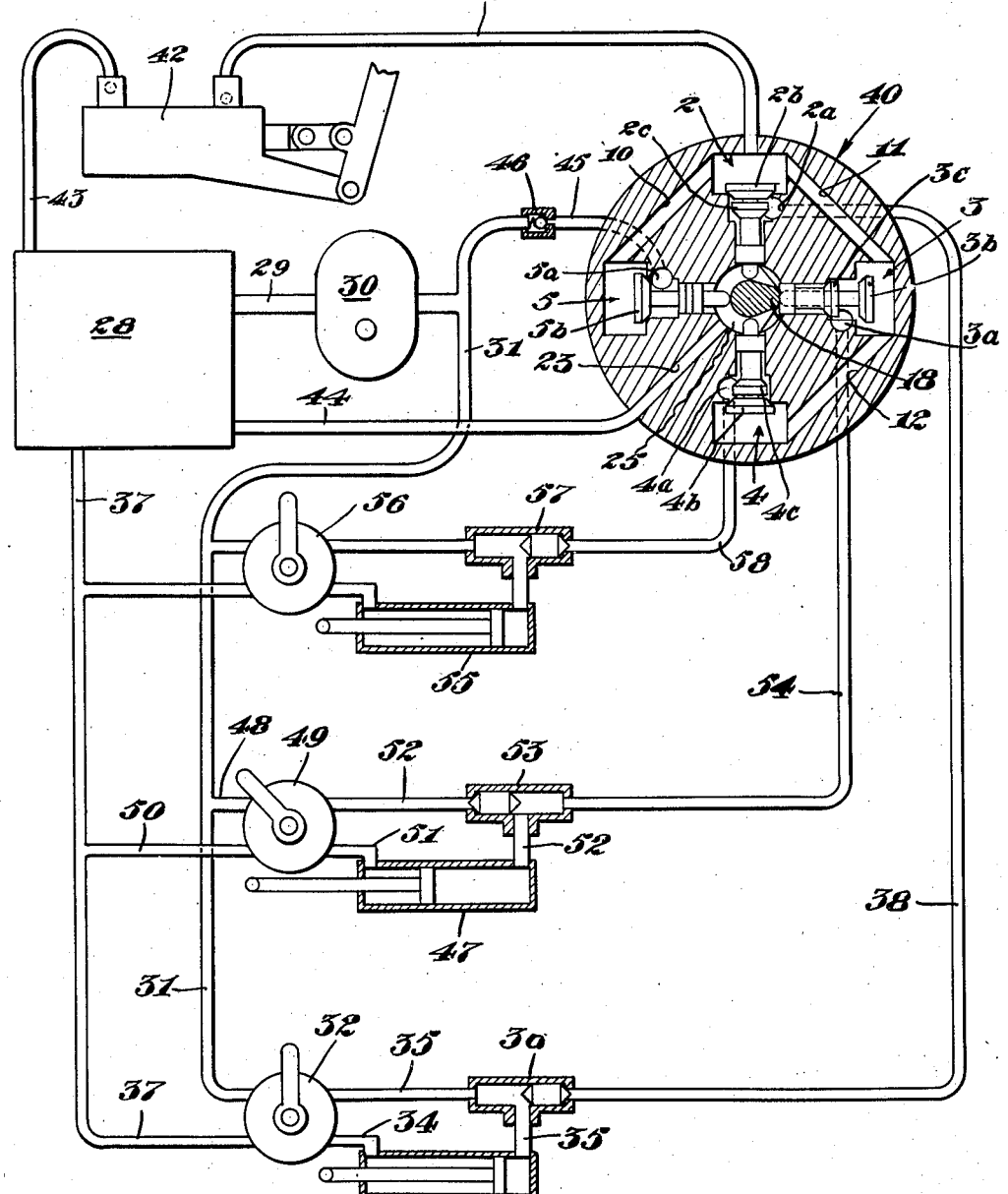
Fig. 4 is a diagrammatic view of the hydraulic system embodying the valve unit of my invention.

Referring to the drawings more specifically, it is seen that one embodiment of a selector valve made in accordance with the present invention includes a substantially circular body 1 having four valve-receiving bores 2, 3, 4 and 5 extending radially from the periphery of the body into a centrally located cam shaft receiving bore 6. This cam shaft bore extends from the front surface 7 of the body 1, part way through the body so that the inner end thereof is closed. The bore 2 has an emergency fluid intake fitting 8 screwed into the outer end thereof whereas the outer ends of the bores 3, 4 and 5 are closed by identical screw plugs 9, which are too short to obstruct the connecting ports next described.

A connecting port 10 extends diagonally in the body to supply pressure fluid from one side of the outer end portion of the bore 2, to the corresponding portion of the bore 5, a second connecting port 11 extends from the other side of said end portion of the bore 2 to the corresponding outer end portion of the bore 3 and a third connecting port 12 extends similarly from the outer end portion of the bore 3 to the corresponding portion of the bore 4 whereby pressure fluid from the bore 2 is supplied to each of the other bores.

It will be seen that these three connecting ports are all straight bores, the opposite bores 10 and 12 being parallel to each other, and the bore which forms the remaining port extending at a right angle to the other two.

Pressure fluid outlet ports 2a, 3a, 4a and 5a extend transversely of the body 1 from the outer surface of an annular boss 13 on the rear surface of the body, so as to intersect the bores 2, 3, 4 and 5 at points spaced inwardly of the aforesaid connecting ports. These outlet ports are tapped to provide for connection thereof with fluid lines as will be hereinafter more fully described.

Pressure poppet valves 2b, 3b, 4b and 5b are arranged to seat on seats 14 provided between the outlet ports and the connecting ports so that said valves may be selectively operated to direct the flow of pressure fluid through said outlet ports.

Each of the pressure valves is urged against its seat by means of a spring 15 and is provided with a stem 16 extending into the cam shaft bore in which a cam shaft 17 is rotatably mounted. A cam 18 on the shaft 17 is disposed to be selectively engaged with the stems 16. Normally the cam 18 is arranged to engage the stem of the valve 5b so that said valve is maintained open inasmuch as the outlet port 5a controlled by said valve provides for connection with the main hydraulic system so that emergency fluid may be supplied thereto.

From its normal position, the cam 18 may be moved to unseat any one of the pressure valves so that emergency operating fluid may be directed through the desired outlet port into any one of several emergency systems to effect an emergency operation, for example, of the cylinders for operating the landing flaps, landing gear, bomb doors, cowl flaps and other mechanisms of an aircraft as will hereinafter be more fully described.

The pressure valves 2b, 3b and 4b have associated therewith spring loaded relief valves 2c, 3c and 4c of the counterbalanced poppet type. These relief or return valves are slidable on the stems 16 of the pressure valves and disposed to engage seats 19 located in inwardly spaced relation to the outlet ports 2a, 3a and 4a in the respective bores 2, 3, and 4. Springs 20 are mounted on the stems 16 for urging the return valves against their seats.

The inner ends of the bores 2, 3, and 4 are closed by means of piston-like enlargements 21 on the tubular stems 22 of the aforesaid return valves so that the latter will control relief ports d extending in the body 1 as shown in Fig. 2 from the bores 2, 3 and 4 into the cam shaft bore 6. These relief ports are disposed between the relief valve seats and the enlargements 21 so that when the relief valves are unseated said relief ports are afforded communication with a relief outlet port 23 extending from the cam shaft bore 6 to the periphery of the body 1 as seen in Fig. 3. A fitting 24 is mounted in the port 23 to provide for a main system connection.

Mounted on the shaft 17 is a double concentric cam member 25 set so that when the pressure valve 5b is unseated by the cam 18 the relief valves 2c, 3c and 4c will be unseated inasmuch as the stems 22 thereof will ride on the cam 25. Moreover, it is seen that the cam 25 is substantially semi-circular with its cut away side on opposite sides of the cam 18 so that when a pressure valve is opened by the cam 18 the associated relief valve will be allowed to close as its stem is then clear of the cam 25, while all the other relief valves will be opened. The purpose of this arrangement is to afford a vent at all times for those of the inoperative emergency fluid conducting lines connected to the valve unit hereof whereby accidental actuation of shuttle valves in the system due to thermal expansion will be prevented as will be hereinafter pointed out.

The pressure valve 5b has no associated relief valve and its stem 16 is formed with a piston-like counterbalancing enlargement 26 working in and sealing the inner end portion of the bore 5, there being a sealing ring 27 on this enlargement. The cam shaft 17 is disposed as shown in Fig. 2 to receive a suitable operating handle (not shown) so that the shaft may be rotated to selectively operate the valve unit.

It will be seen that the valve body 1 is completely circular and is substantially solid except where bored out to form the various passages thereof, and hence affords a very sturdy, dependable mounting means for the valves and valve operating means supported by it.

The selective valve unit of this invention is especially designed for directing emergency operating fluid from an emergency hand pump either into a main hydraulic system in which a plurality of hydraulic cylinders are normally operated by a power driven pump with a selective control valve for each cylinder, or into any one of several emergency lines connected through shuttle valves to said cylinders and main system.

Such a system is shown diagrammatically in Fig. 8 and includes a reservoir 28 connected by a line 29 with a power operated pump 30. This pump is connected by a pressure fluid line 31 to a 4-way control valve 32 for a hydraulic cylinder 33 arranged for example to operate the landing flaps of an aircraft. A cylinder line 34 leads from the valve 32 to one end of the cylinder 33 whereas a cylinder line 35 leads through a shuttle valve 36 to the valve 32. A return line 37 leads from the valve 32 back to the reservoir 28.

The shuttle valve 36 is connected by an emergency line 38 to the port 2a controlled by the pressure valve 2b in the bore 2 of my emergency selector valve which is here designated 40. The bore 2 is supplied with pressure fluid through a line 41 leading from an emergency hand pump 42 to the intake fitting 8, said hand pump being connected to the reservoir 28 by means of a line 43. A return line 44 connects the relief outlet port 23 of the valve unit 40 with the reservoir 28. A line 45 connects the system port 5a of the emergency selector valve to the pressure fluid line 31 leading from the power operated pump 30, there being a check valve 46 in line 44 to prevent pressure fluid flowing from the power pump 30 to the ports 5a.

The system also includes a hydraulic cylinder 47, arranged for example, to operate the landing gear of an airplane, which cylinder is connected to the emergency valve 40 in the same manner as the cylinder 33 there being a pressure line 48 connecting a control valve 49 with the system pressure line 31 and a return line 50 connecting the valve 49 with the system return line 37, also cylinder lines 51 and 52 leading from the valve 49 to cylinder 47. A shuttle valve 53 is mounted in the line 52 and an emergency fluid line 54 leads from the shuttle valve to the port 3a controlled by the valve 3b in the bore 3 of the selector valve 40.

As here shown, a third cylinder 55 is connected similarly in the system and controlled by a 4-way valve 56 for operating, for example the bomb doors of an aircraft. This cylinder has a shuttle valve 57 in one of its cylinder lines and said shuttle valve is connected by an emergency fluid 58 to the port 4a of the emergency selector valve 40.

The system hereinbefore described is subject to normal operation by means of a power pump 30 under control of the several selector valves associated with the respective cylinders. However should the pump 30 fail or in the event that the pump is shut off and it is desired to operate the system from fluid supplied by the hand pump 42, the operator now commences the operation of the hand pump and as the emergency valve unit 40 is normally set as shown in Fig. 2 so that the pressure valve 5b is open while the other pressure valves are closed, fluid from the hand pump will pass through line 41, fitting 8, connecting port 10, bore 5, port 5a, system emergency line 45 and into the main pressure line 31.

With the emergency valve 40 thus connected into the main system a complete operation of the several cylinders of this system is made possible under control of the respective 4-way valves with pressure fluid supplied by the hand pump.

It is noted that the fluid returns from certain corresponding ends of the several cylinders through the shuttle valves, control valves, back to reservoir 28. If, however, a shuttle valve is in position obstructing the normal return flow to the reservoir, the fluid will return through the associated emergency line to the emergency selector valve unit 40, thence through relief outlet port 23, and return line 44 to the reservoir. This return flow through the selector valve unit is made possible due to the fact that the return or relief valves 2c, 3c and 4c are normally held open as shown in Fig. 2.

Assuming that the motor pump 30 fails or a line of the main system is shot away, or otherwise damaged, and the hydraulic cylinders are rendered inoperative as far as the main system is concerned, it is now necessary to operate the hand pump and emergency valve 40. The inoperativeness of the main system is ascertained when the selected cylinder fails to respond to the manipulation of its associated valve. The operator then leaves this valve in the position into which it is moved in anticipation of a predetermined operation of its associated cylinder, then turns the cam shaft 17 of the emergency valve unit 40 to bring the cam 18 into position to open a selected one of the pressure valves 2b, 3b and 4b, for example, the valve 3b which controls the flow of emergency fluid through the line 54 to the landing gear cylinder 47 as shown in Fig. 4, the extension of the landing being desired. Having set the emergency selector valve to open pressure valve 3b, the operator now operates the hand pump 42 so that pressure fluid is forced therefrom through line 41 into the outer end of the bore 2, thence through connecting port 11 into the outer end of the port 3. As the pressure valve 3b is now held open by the cam 18 and the associated relief or return valve 3c is closed while the other relief valves are held open by the cam 25, the fluid will flow through the port 3a into line 54, shuttle valve 53, cylinder line 52, to the right end of the cylinder, whereby the landing gear may be extended. Return fluid from the left end of the cylinder 47 will pass through the cylinder line 51, valve 49 and back to the reservoir, or will be discharged from a broken line if such damaged line happens to be in the path of this return fluid.

It will now be apparent that my improved selector valve may be operated to effect an emergency operation of any one of the several cylinders in the system independently of the control valves and other components of said main system which would normally be operated, or that the hand pump may be substituted for the motor pump to supply operating fluid to the main system in which case these cylinders would be under control of their regular control valves.

It should be noted that the valve receiving bores are of identical formation and that the valve units are interchangeable with respect to said bores whereby they may be arranged as desired to best suit the particular use of the device, it being possible to mount and operate valve 5b in any of the bores or mount and operate one of the dual or coaxial valve units in the bore 5b.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a selector valve for coupling a hand pump with hydraulic systems, a valve body having a cam shaft bore and a plurality of valve-receiving bores, means for intaking pressure fluid into one of said valve-receiving bores, connecting ports for supplying pressure fluid from said one bore to the other valve-receiving bores, outlet ports leading from said valve-receiving bores through an outer surface of said body, pressure valve seats provided in said valve-receiving bores between the connecting ports and said outlet ports, poppet pressure valves seating against said seats for controlling the outflow of pressure fluid through said outlet ports, stems on said pressure valves extending into said cam shaft bore, relief ports extending from all but one of said valve-receiving bores into said cam shaft bore, a return fluid discharge port for discharging return fluid from said cam shaft bore, relief valve seats in all but one of said valve-receiving bores at points between said outlet ports and said relief ports, poppet relief valves seating against said relief valve seats for controlling the inflow of fluid through associated outlet ports, tubular valve stems on said relief valves telescoping the stems of the associated pressure valves and extending into said cam shaft bore, a cam shaft rotatable in the bore therefor, a cam on said shaft for selectively engaging the stems of and opening said pressure valves, a second cam arranged on said shaft to engage the stems of and unseat all of said relief valves when the first named cam is operative to open the one pressure valve which has no associated relief valve, and operating when a selected one of the other pressure valves is unseated to allow the relief valve associated with said selected valve to seat while maintaining the other relief valves unseated.

2. In a selector valve for coupling a hand pump with hydraulic systems, a valve body having a cam shaft bore and a plurality of valve-receiving bores, means for intaking pressure fluid into one of said valve-receiving bores, connecting ports for supplying pressure fluid from said one bore to the other valve-receiving bores, outlet ports leading from said valve-receiving bores through an outer surface of said body, pressure valve seats provided in said valve-receiving bores between the connecting ports and said outlet ports, poppet pressure valves seating against said seats for controlling the outflow of pressure fluid through said outlet ports, stems on said pressure valves extending into said cam shaft bore, relief ports extending from all but one of said valve-receiving bores into said cam shaft bore, a return fluid discharge port for discharging return fluid from said cam shaft bore, relief valve seats in all but one of said valve-receiving bores at points between said outlet ports and said relief ports, poppet relief valves seating against said relief valve seats for controlling the inflow of fluid through associated outlet ports, tubular valve stems on said relief valves telescoping the stems of the associated pressure valves and extending into said cam shaft bore, a cam shaft rotatable in the bore therefor, a cam on said shaft for selectively engaging the stems of and opening said pressure valves, a second cam arranged on said shaft to engage the stems of and unseat all of said relief valves when the first named cam is operative to open the one pressure valve which has no associated relief valve, and operating when a selected one of the other pressure valves is unseated to allow the relief valve associated with said selected valve to seat while maintaining the other relief valves unseated, said body being substantially circular with the cam shaft centrally located therein and the valve receiving bores extending radially from the cam shaft bore and opening on the periphery of said body.

3. In a selector valve for coupling a hand pump with hydraulic systems, a valve body having a cam shaft bore and a plurality of valve-receiving bores, means for intaking pressure fluid into one of said valve-receiving bores, connecting ports for supplying pressure fluid from said one bore to the other valve-receiving bores, outlet ports leading from said valve-receiving bores through an outer surface of said body, pressure valve seats provided in said valve-receiving bores between the connecting ports and said outlet ports, poppet pressure valves seating against said seats for controlling the outflow of pressure fluid through said outlet ports, stems on said pressure valves extending into said cam shaft bore, relief ports extending from all but one of said valve-receiving bores into said cam shaft bore, a return fluid discharge port for discharging return fluid from said cam shaft bore, relief valve seats in all but one of said valve-receiving bores at points between said outlet ports and said relief ports, poppet relief valves seating against said relief valve seats for controlling the inflow of fluid through associated outlet ports, tubular valve stems on said relief valves telescoping the stems of the associated pressure valves and extending into said cam shaft bore, a cam shaft rotatable in the bore therefor, a cam on said shaft for selectively engaging the stems of and opening said pressure valves, a second cam arranged on said shaft to engage the stems of and unseat all of said relief valves when the first named cam is operative to open the one pressure valve which has no associated relief valve, and operating when a selected one of the other pressure valves is unseated to allow the relief valve associated with said selected valve to seat while maintaining the other relief valves unseated, said body being substantially circular with the cam shaft centrally located therein and the valve reeceiving bores extending radially from the cam shaft bore and opening on the periphery of said body, said cam shaft extending outwardly from one face of said body, said return fluid discharge port opening on the periphery of said body, said outlet ports opening on the other face of said body.

4. In a selector valve for coupling a hand pump with hydraulic systems, a valve body having a cam shaft bore and a plurality of valve-receiving bores, means for intaking pressure fluid into one of said valve-receiving bores, connecting ports for supplying pressure fluid from said one bore to the other valve-receiving bores, outlet ports leading from said valve-receiving bores through an outer surface of said body, pressure valve seats provided in said valve-receiving bores between the connecting ports and said outlet ports, poppet pressure valves seating against said seats for controlling the outflow of pressure fluid through said outlet ports, stems on said pressure valves extending into said cam shaft bore, relief ports extending from all but one of said valve-receiving bores into said cam shaft bore, a return fluid discharge port for discharging return fluid from said cam shaft bore, relief valve seats in all but one of said valve-receiving bores at points between said outlet ports and said relief ports, poppet relief valves seating against said relief valve seats for controlling the inflow of fluid through associated outlet ports, tubular valve stems on said relief valves telescoping the stems of the associated pressure valves and extending into said cam shaft bore, a cam shaft rotatable in the bore therefor, a cam on said shaft for selectively engaging the stems of and opening said pressure valves, a second cam arranged on said shaft to engage the stems of and unseat all of said relief valves when the first named cam is operative to open the one pressure valve which has no associated relief valve, and operating when a selected one of the other pressure valves is unseated to allow the relief valve associated with said selected valve to seat while maintaining the other relief valves unseated, said body being substantially circular with the cam shaft centrally located therein and the valve-receiving bores extending radially from the cam shaft bore and opening on the periphery of said body, said connecting ports extending diagonally between the bores connected thereby, said outlet ports extending axially of the body and substantially at right angles to said valve-receiving bores.

5. In a selector valve for coupling a hand pump with hydraulic systems, a valve body having a cam shaft bore and a plurality of valve-receiving bores, means for intaking pressure fluid into one of said valve-receiving bores, connecting ports for supplying pressure fluid from said one bore to the other valve-receiving bores, outlet ports leading from said valve-receiving bores through an outer surface of said body, pressure valve seats provided in said valve-receiving bores between the connecting ports and said outlet ports, poppet pressure valves seating against said seats for controlling the outflow of pressure fluid through said outlet ports, stems on said pressure valves extending into said cam shaft bore, relief ports extending from all but one of said valve-receiving bores into said cam shaft bore, a return fluid discharge port for discharging return fluid from said cam shaft bore, relief valve seats in all but one of said valve-receiving bores at points between said outlet ports and said relief ports, poppet relief valves seating against said relief valve seats for controlling the inflow of fluid through associated outlet ports, tubular valve stems on said relief valves telescoping the stems of the associated pressure valves and extending into said cam shaft bore, a cam shaft rotatable in the bore therefor, a cam on said shaft for selectively engaging the stems of and opening said pressure valves, a second cam arranged on said shaft to engage the stems of and unseat all of said relief valves when the first named cam is operative to open the one pressure valve which has no associated relief valve, and operating when a selected one of the other pressure valves is unseated to allow the relief valve associated with said selected valve to seat while maintaining the other relief valves unseated, said body being substantially circular with the cam shaft centrally located therein and the valve-receiving bores extending radially from the cam shaft bore and opening on the periphery of said body, said connecting ports extending diagonally between the bores connected thereby, said outlet ports extending axially of the body and substantially at right angles to said valve-receiving bores, said return fluid discharge port extending radially from the cam shaft bore and opening on the periphery of said body.

6. In a selector valve for coupling a hand pump with hydraulic systems, a valve body having a cam shaft bore and a plurality of valve-receiving bores, means for intaking pressure fluid into one of said valve-receiving bores, connecting ports for supplying pressure fluid from said one bore to the other valve-receiving bores, outlet ports leading from said valve-receiving bores through an outer surface of said body, pressure valve seats provided in said valve-receiving bores between the connecting ports and said outlet ports, poppet pressure valves seating against said seats for controlling the outflow of pressure fluid through said outlet ports, stems on said pressure valves extending into said cam shaft bore, relief ports extending from all but one of said valve-receiving bores into said cam shaft bore, a return fluid discharge port for discharging return fluid from said cam shaft bore, relief valve seats in all but one of said valve-receiving bores at points between said outlet ports and said relief ports, poppet relief valves seating against said relief valve seats for controlling the inflow of fluid through associated outlet ports, tubular valve stems on said relief valves telescoping the stems of the associated pressure valves and extending into said cam shaft bore, a cam shaft rotatable in the bore therefor, a cam on said shaft for selectively engaging the stems of and opening said pressure valves, a second cam arranged on said shaft to engage the stems of and unseat all of said relief valves when the first named cam is operative to open the one pressure valve which has no associated relief valve, and operating when a selected one of the other pressure valves is unseated to allow the relief valve associated with said selected valve to seat while maintaining the other relief valves unseated, a piston-like counterbalancing enlargement on the inner end of one of said pressure valves and similar piston-like enlargement on the inner ends of said relief valves.

7. In a selector valve for coupling a hand pump with hydraulic systems, a valve body having a cam shaft bore and a plurality of valve-receiving bores, means for intaking pressure fluid into one of said valve-receiving bores, connecting ports for supplying pressure fluid from said one bore to the other valve-receiving bores, outlet ports leading from said valve-receiving bores through an outer surface of said body, pressure valve seats provided in said valve-receiving bores between the connecting ports and said outlet ports, poppet pressure valves seating against said seats for controlling the outflow of pressure fluid through said outlet ports, stems on said pressure valves extending into said cam shaft bore, relief ports extending from all but one of said valve-receiving bores into said cam shaft bore, a return fluid discharge port for discharging return fluid from said cam shaft bore, relief valve seats in all but one of said valve-receiving bores at points between said outlet ports and said relief ports, poppet relief valves seating against said relief valve seats for controlling the inflow of fluid through associated outlet ports, tubular valve stems on said relief valves telescoping the stems of the associated pressure valves and extending into said cam shaft bore, a cam shaft rotatable in the bore therefor, a cam on said shaft for selectively engaging the stems of and opening said pressure valves, a second cam arranged on said shaft to engage the stems of and unseat all of said relief valves when the first named cam is operative to open the one pressure valve which has no associated relief valve, and operating when a selected one of the other pressure valves is unseated to allow the relief valve associated with said selected valve to seat while maintaining the other relief valves unseated, a piston-like counterbalancing enlargement on the inner end of one of said pressure valves and similar piston-like enlargements on the inner ends of said relief valves, said second cam having like cam portions disposed on opposite sides of the first named cam, said pressure valve stems extending inwardly beyond the tubular valve stems.

8. In a selector valve for connecting a hand pump with hydraulic systems, a valve body having a plurality of valve-receiving bores, means for introducing fluid under pressure into the outer end of one of said bores, a connecting port for conducting pressure fluid from the outer end portion of said one bore into the corresponding portion of another of said bores, a pressure fluid discharge port leading from the second named bore to an outer surface of said body and adapted to conduct pressure fluid to a hydraulic system, a second connecting port for conducting pressure fluid from the outer end portion of the first named bore to the corresponding portion of another of said bores, outlet ports opening into the first named and third named bores at points spaced inwardly of the connecting port therefor, for supplying pressure fluid to other hydraulic systems and for receiving return fluid from said systems, pressure valve seats in said bores between the connecting ports and the outlet ports, poppet pressure valves seating on said seats for controlling the outflow of pressure fluid through the latter, relief ports for discharging return fluid from said first named and third named bores, relief valve seats in said first named and third named bores between their outlet ports and their relief ports, poppet relief valves seating on the seats therefor for controlling the flow of return fluid through said relief ports, and valve operating means for selectively opening said pressure valves so that when the pressure valve in the second named bore is opened, the relief valves will be opened, and when one of the other pressure valves is opened its associated relief valve will be closed and the other relief valve will be opened.

CARL J. STRID.